July 16, 1929.  H. H. NESBITT  1,720,919
FLOAT MECHANISM FOR COOLING TANKS
Original Filed July 30, 1926
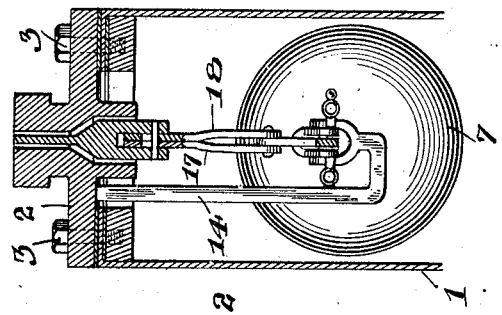
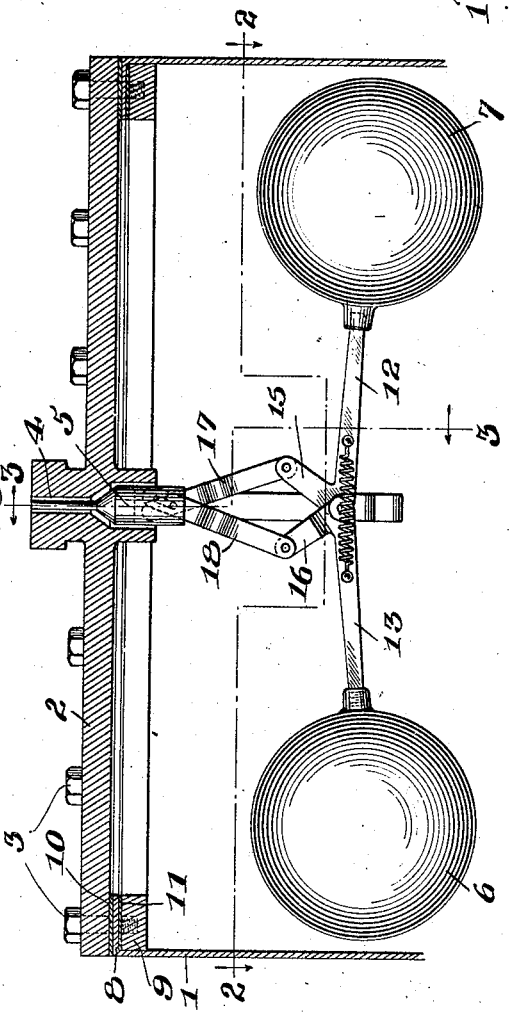
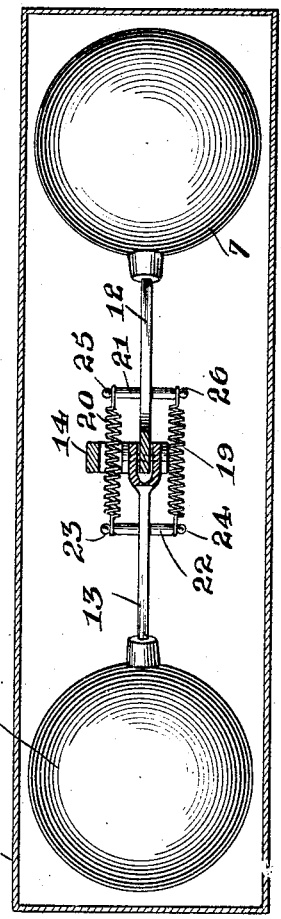
Inventor
Harold H. Nesbitt
By Mason Fenwick & Lawrence
Attorneys Patented July 16, 1929.

1,720,919

UNITED STATES PATENT OFFICE.

HAROLD H. NESBITT, OF BELAIR, MARYLAND.

FLOAT MECHANISM FOR COOLING TANKS.

Application filed July 30, 1926, Serial No. 126,061. Renewed December 12, 1928.

This invention relates to improvements in float mechanisms for cooling tanks, particularly in a float mechanism adapted for use in cooling tanks connected with refrigerating apparatus.

An object of this invention is to provide a float mechanism which will be simple and inexpensive to manufacture, and at the same time provide a device which will function to actuate the valve in the tank irrespective of damage to certain portions of the float mechanism.

A further object of this invention is to provide a float mechanism which will function to reduce the possibility of intermittent operation due to friction or otherwise in the moving parts of the mechanism.

Another object of this invention is to provide a float mechanism having a plurality of floats arranged in such a manner that damage to one of the floats will still enable the mechanism to function and the valve to close or open.

Further objects of this invention will appear from the following detailed description and as disclosed in the single sheet of drawings which is herewith made a part of this application.

In the drawings,

Fig. 1 illustrates a vertical sectional side view of the float mechanism showing the different elements in assembled relationship within a section of the tank.

Fig. 2 represents a sectional view of the float mechanism taken along lines 2—2 of Fig. 1.

Fig. 3 illustrates a sectional view of the mechanism taken along lines 3—3 of Fig. 1.

Numeral 1 designates a tank made of a suitable material having a cap portion 2 detachably connected along the upper edge of the tank 1 by means of machine screws 3 or otherwise. The cap 2 may be constructed of any suitable material and has an opening 4 located therein, the opening 4 being provided with a suitable valve 5, which is operated at intervals for closing and opening, depending on the position of the floats 6 and 7 within the tank. The elements 6 and 7 within the tank 1 are adapted to float on the tank liquid and will fluctuate in height within the tank, depending on the rise and fall of the liquid therein.

The tank 1 in this invention is preferably provided with an inwardly extending flange portion 8 along the upper edge thereof. The cap 2 may be firmly secured and sealed to the flange 8 by means of the machine screws 3, the ring 9 and suitable gasket portions 10 and 11 located between the flange and ring and between the flange and cap portion 2.

The float balls 6 and 7 may be made of any suitable material and have connected thereto, arm elements 12 and 13. A supporting bracket 14 extends from the cap portion 2 downwardly into the tank, the bracket 14 having its lower end suitably formed for receiving in pivotal relationship thereto, the arm portions 12 and 13. The arm portions 12 and 13 are provided with hooked shape extensions 15 and 16 respectively arranged to pivotally connect with an end of the link portions 17 and 18 respectively, the other ends of the link portions 17 and 18 being adapted to slidably and pivotally engage with the valve 5.

In order to facilitate the movement of the valve, and give to it a snap action in the opening and closing thereof at the desired time, tension springs 19 and 20 are suitably positioned in relationship to the arm elements 12 and 13, as by means of pins 21 and 22 extending from the arms 12 and 13 respectively and being pivotally connected thereto as at 23, 24, 25, and 26.

In operation this invention will provide a float mechanism simple and inexpensive to manufacture, having an unusual safeguard thereby obviating many of the inconveniences due to intermittent functioning of float mechanism now in common use. The floats in this invention are arranged in such a manner that the valve will function to open and close in spite of ordinary damage to mechanism.

What I claim is:

1. In a device of the character described, a tank, a valve in the tank, float controlled means in the tank for operating the valve comprising a plurality of floats, each float being adapted to operate the valve as required irrespective of any other float, tension means for snapping the valve into open and closed position after movement of the floats.

2. In a device of the character described, a tank, a valve in the tank, float controlled means in the tank for operating the valve comprising a plurality of floats, each float being adapted to operate the valve as required irrespective of any other float, tension means for snapping the valve into open and closed position after movement of the floats, means for supporting the floats consisting of a bracket portion extending from a suitable portion of the tank.

3. In a device of the character described, a tank, a valve in the tank, float controlled means in the tank for operating the valve comprising a plurality of floats and arm elements extending from the floats, each float being adapted to operate the valve as required irrespective of any other float, tension means for snapping the valve into open and closed position after movement of the floats, means for supporting the floats consisting of a bracket portion extending from a suitable portion of the tank.

4. In a device of the character described, a tank, a valve in the tank, float controlled means in the tank for operating the valve comprising a plurality of floats and arm elements extending from the floats, each float being adapted to operate the valve as required irrespective of any other float, tension means for snapping the valve into open and closed position after movement of the floats, means for supporting the floats consisting of a bracket portion extending from a suitable portion of the tank, the bracket being formed to receive in pivotal relationship thereto the arm elements.

5. In a device of the character described, a tank, a valve in the tank, float controlled means in the tank for operating the valve comprising a plurality of floats, arm elements extending from the floats, and extensions from the arms, each float being adapted to operate the valve as required irrespective of any other float, tension means for snapping the valve into open and closed position after movement of the floats, means for supporting the floats consisting of a bracket portion extending from a suitable portion of the tank, the bracket being formed to receive in pivotal relationship thereto the arm elements, link elements pivotally connected at one end to the arm extensions and, at the other end, slidably and pivotally engaged with the valve.

In testimony whereof I affix my signature.

HAROLD H. NESBITT.